United States Patent [19]

Blanchet et al.

[11] Patent Number: 5,768,941
[45] Date of Patent: *Jun. 23, 1998

[54] MOTORIZED REDUCTION GEAR UNIT COMPRISING A HOLLOW CASING HAVING A COVER PLATE, ESPECIALLY FOR A SCREEN WIPING APPARATUS

[75] Inventors: Pierre Blanchet, Lencloitre, France; Stëphane Hommelet, Chatellerault, France

[73] Assignee: Valeo Systemes D'Essuyage, La Verriere, France

[ * ] Notice: The term of this patent shall not extend beyond the expiration date of Pat. No. 5,622,077.

[21] Appl. No.: 461,266

[22] Filed: Jun. 5, 1995

[30] Foreign Application Priority Data

Sep. 29, 1994 [FR] France ................................ 94 11659

[51] Int. Cl.$^6$ ............................... B60S 1/16; F16H 21/40
[52] U.S. Cl. ................................ 74/42; 74/32; 74/606 R; 15/250.3
[58] Field of Search .................................. 74/42, 32, 75, 74/606 R; 15/250.3, 250.31

[56] References Cited

U.S. PATENT DOCUMENTS 5,203,219  4/1993  Blanchet .

FOREIGN PATENT DOCUMENTS 0 479 673  8/1992  European Pat. Off. .
2552723    4/1985  France .
41 01 063  7/1992  Germany .

OTHER PUBLICATIONS

French Search Report dated 24 Feb. 1995.

*Primary Examiner*—Charles A. Marmor
*Assistant Examiner*—Troy Graham
*Attorney, Agent, or Firm*—Morgan & Finnegan, LLP

[57] ABSTRACT

A motorized reduction gear unit for any purpose having a crank and connecting rod mechanism incorporated in it, but especially for use as a vehicle screen wiper drive unit, comprises a hollow casing having a cover plate, with, within the hollow interior of the casing, a toothed wheel which is rotatable about an axis. The toothed wheel carries a gudgeon pin parallel to the axis of rotation of the toothed wheel but eccentric with respect to the latter. The pin drives a crank and connecting rod system in which the crank and connecting rod are articulated together about a pivot pin, so that continuous rotary motion of the toothed wheel is converted thereby into alternating rotary motion of an output shaft. It further includes a peripheral gasket disposed between the upper edge of the casing and the cover plate, together with a friction plate element in the form of a thickened friction portion disposed fixedly on the inner surface of the cover plate facing towards the casing. The peripheral gasket and the friction plate element together constitute a monobloc component.

9 Claims, 3 Drawing Sheets

MOTORIZED REDUCTION GEAR UNIT COMPRISING A HOLLOW CASING HAVING A COVER PLATE, ESPECIALLY FOR A SCREEN WIPING APPARATUS

FIELD OF THE INVENTION

This invention relates to a motorized reduction gear unit comprising a hollow casing having a cover plate, especially a motorized reduction gear unit of a screen wiping system for a vehicle.

BACKGROUND OF THE INVENTION

Such a unit generally comprises an electric drive motor together with a speed reducing mechanism, in particular a mechanism of the worm type enclosed within the hollow casing by the cover plate.

The casing includes within its hollow interior, as is well known, a toothed wheel which is driven in rotation by the worm, and which actuates, via an eccentric gudgeon pin carried by this toothed wheel, a crank and connecting rod system which operates an output shaft, in such a way that the latter moves in alternating rotary motion. The output shaft extends through the base of the casing for connection with the screen wiper to be driven by it.

The crank and connecting rod system consists of an arm which is connected at one of its ends to the eccentric gudgeon pin carried by the toothed wheel. At its other end, this arm has a toothed sector which meshes with a second toothed sector. This second toothed sector is in turn fixed to the output shaft. In order that the two toothed sectors will remain in continuous engagement, they are linked together on either side by means of balance members, which also constitute the crank of the crank and connecting rod system.

However, such a motorized reduction gear unit has to be able to transmit very large forces. The crank and connecting rod system is subjected not only to forces transmitted by the toothed wheel in the axis of rotation of the connecting rod, which can cause the crank and connecting rod system stall, so as to give rise to axial displacement of the pivot of that system, but also to axial forces on the axis of the gudgeon pin, or on the axis of the output shaft itself.

It has previously been proposed, in a previous patent application of the present Applicants, namely French published patent application FR 2 667 670A, to immobilize against axial movement the eccentric gudgeon pin which is carried by the toothed wheel, by locating it against the cover plate by means of a friction plate which is fixed against the inner surface of the cover plate, and on which the end of the gudgeon pin engages. The same document also proposes the provision of a friction ring surrounding the end of the output shaft and disposed against the inner surface of the cover plate, being in engagement on one of the balance members that surround the output shaft.

These expedients avoid the situation in which the eccentric pin or the output shaft impact on the inner surface of the cover plate accidentally due to axial forces, so giving rise to noise. However, this problem still remains in connection with the crank and connecting rod system.

Accordingly, a simple and inexpensive way is sought to improve the operation of the pivotal connections at the eccentric gudgeon pin of the toothed wheel, and in the crank and connecting rod system.

In addition, in order to provide sealing against ingress of grease and dust into the flat joint between the cover plate and the casing, it is usual to arrange a gasket between the edge of the said cover plate and that of the casing. However, this gasket, which is currently made in a very fragile material, is a component which can easily become torn during assembly operations. In addition, because this component is very malleable, it is quite a delicate operation to fit it in place in the joint between the casing and the cover plate.

DISCUSSION OF THE INVENTION

According to the invention, a motorized reduction gear unit comprising a hollow casing having a cover plate, in particular a motorized gear unit for a screen wiping system, comprising, within the hollow interior of the said casing, a toothed wheel which is rotatable about an axis, the toothed wheel carrying a gudgeon pin having an axis parallel to the said axis of the toothed wheel and eccentric with respect to the latter, the said pin driving a crank and connecting rod system which is articulated about a pivot, whereby to derive from continuous rotational motion of the said toothed wheel an alternating rotary motion of an output shaft connected to the end of the crank, further includes a peripheral gasket portion disposed between the upper edge of the casing and the cover plate, and a thickened friction portion disposed on and fixed with respect to the internal face of the cover plate facing towards the casing. It is characterised in that the peripheral gasket portion and the friction plate constitute a monobloc component.

Thus, by virtue of the invention, the gasket is incorporated in a monobloc component which is in consequence much more rigid than previous arrangements; and handling of this component and its fitting in the joint between the casing and the cover plate is made much easier.

According to another preferred feature of the invention, the said monobloc component comprises, disposed on the internal surface of the cover plate facing towards the casing, an engagement surface for abutting engagement of the crank in the vicinity of the pivot pin.

This solution has the further advantage that the functions of sealing, preventing the ingress of grease or dust into the interior of the casing, and abutting engagement of the eccentric gudgeon pin carried by the toothed wheel and of the crank and connecting rod system at its pivot, are all achieved by a single component. In this way, the mesh between the toothed sectors, and the pivoting couplings on the eccentric gudgeon pin axis and between the connecting rod and crank, are all improved, so reducing noise occurring at these locations and increasing the useful life of the various components of the motorized reduction gear unit.

According to another preferred feature of the invention, the said engagement surface comprises at least one arcuate track arranged concentrically with the output shaft.

According to a further preferred feature of the invention, the engagement surface comprises two concentric tracks defining a slot on an arc of a circle.

According to yet another preferred feature of the invention, the circle of which the said arc is a part is centred on the axis of the output shaft, and has a radius which is substantially equal to the distance separating the said axis of the output shaft from the axis of the pivot between the crank and the connecting rod.

Thanks to the features mentioned above, the engagement surface provided by the invention is disposed over the whole path of the pivot between the crank and the connecting rod as it rotates about the output shaft.

According to another preferred feature of the invention, the friction plate portion of the monobloc component is disposed over the whole circular path of the pin, about the axis of the toothed wheel.

According to a further preferred feature of the invention, the monobloc component further includes a perforated friction ring portion arranged coaxially with the output shaft. This ring portion provides an abutting engagement for the output shaft, by immobilising the latter against axial movement and against any radial movements of the end of the output shaft.

According to yet another preferred feature of the invention, the various elements comprising the gasket and/or thickened friction portion, and/or friction ring portion and/or engagement surface, of the monobloc component, are joined together by connecting means which are moulded in the monobloc component together with the different elements of the said component.

According to another preferred feature of the invention, the monobloc component is of a material having a low coefficient of friction.

Further features and advantages of the invention will appear more clearly on a reading of the description of a preferred embodiment of the invention which follows, and which is given by way of example only and with reference to the accompanying drawings.

DESCRIPTION OF A PREFERRED EMBODIMENT OF THE INVENTION

Figure 1:
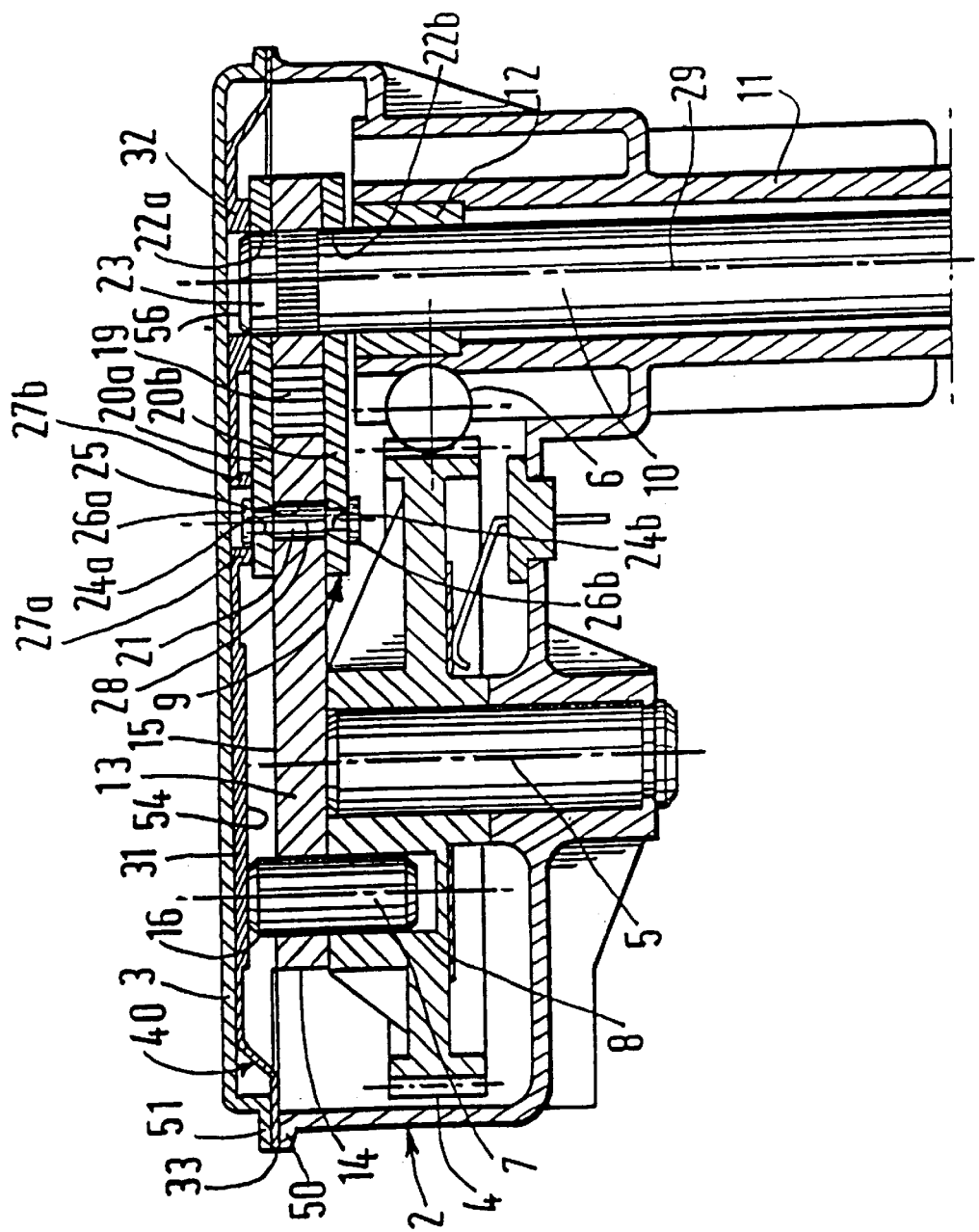
FIG. 1 is a diagrammatic view in cross section showing a motorized reduction gear unit having a cover plate in accordance with the invention.
Figure 2:
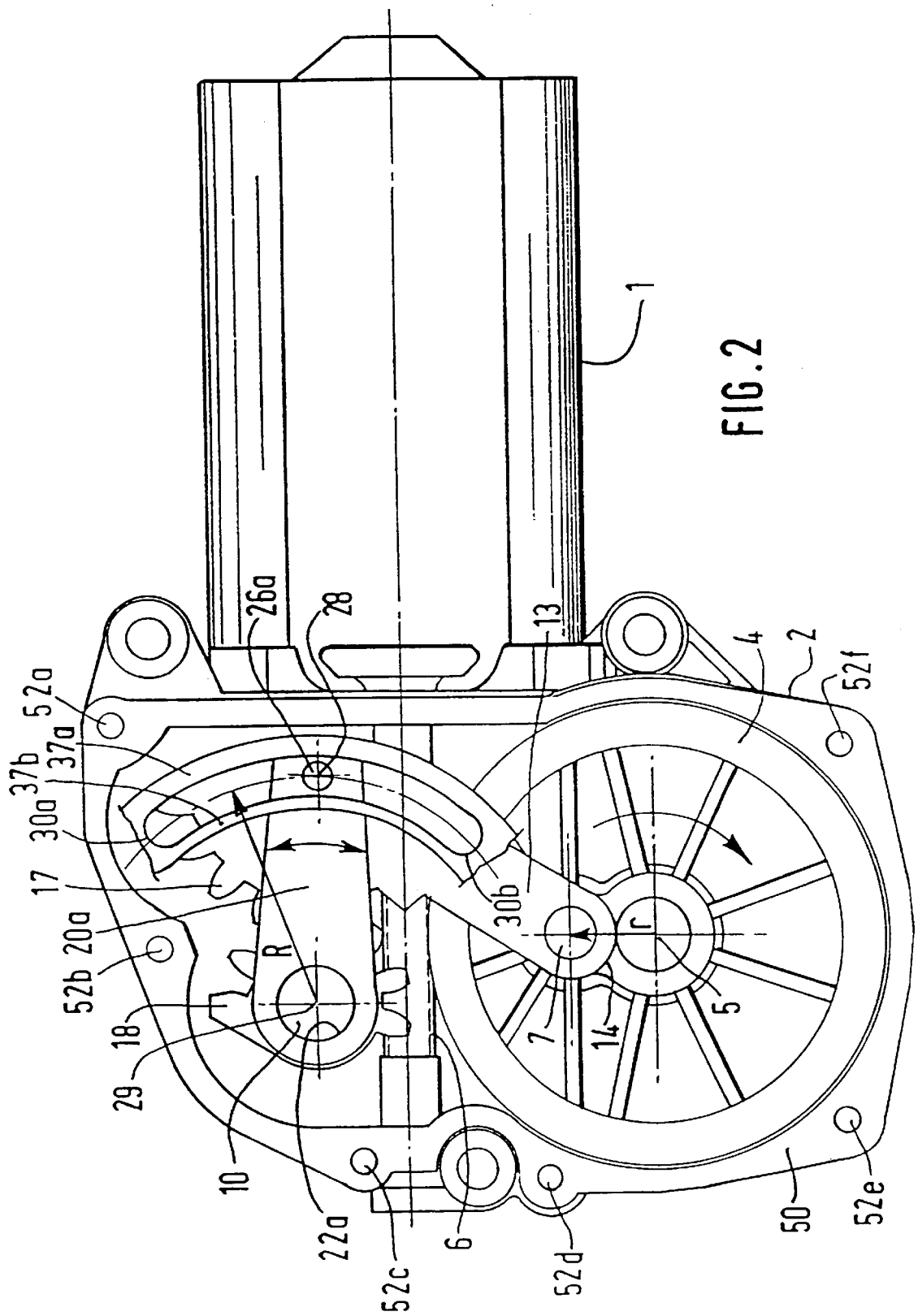
FIG. 2 is a view in elevation of a motorized reduction gear unit showing the contacts, concentric with the output shaft, attached under the cover plate, the cover plate being considered, for convenience, to be transparent here.

FIGS. 1 and 2 show a motorized reduction gear unit, in particular for driving a screen wiping system. The unit comprises an electric motor 1 and a hollow casing 2 having a cover plate 3. The casing 2 contains a reduction gear system which comprises a toothed wheel 4. The wheel 4 is rotatable about a shaft 5, and is driven by means of a worm 6 carried by the rotor of the electric motor 1. The toothed wheel 4 carries a gudgeon pin 7, which is parallel to the shaft 5 and which is substantially offset eccentrically with respect to the latter. The pin 5 is mounted for free rotation in a recess 8 formed in the toothed wheel 4.

The pin 7 is coupled to a crank and connecting rod system 9, which converts the rotary motion of the toothed wheel 4 into oscillating motion, i.e. alternating rotary motion, of an output shaft 10. The output shaft 10 is mounted within a sleeve 11 situated at the base of the casing 2 and resting on a bearing 12. Its lower end (not shown) projects out of the casing and is coupled in the usual way to the screen wipers.

The crank and connecting rod system 9 comprises an arm 13, which constitutes a connecting rod and is coupled at one of its ends, 14, to the gudgeon pin 7, in such a way as to leave an end portion 16 of the pin 7 projecting beyond the outer face 15 of the arm 13. The other end of the arm 13 is formed with a toothed sector 17. This toothed sector meshes at 19 with another toothed sector 18, which is fixed to the output shaft 10.

The two toothed sectors 17 and 18 are held in constant engagement by means of two balance members 20a and 20b, which are located on either side of the longitudinally extending faces of the toothed sectors 17 and 18. The two balance members 20a and 20b constitute the crank of the system mentioned above, coupling the arm 13 and the output shaft 10 rigidly together. The two balance members are held together, firstly by means of an aperture 22a (for the balance member 20a) and an aperture 22b (for the balance member 20b), these apertures being arranged at one end of the balance members and surrounding an end portion 23 of the output shaft 10. The balance members are also held together by a freely rotatable pivot pin 21 which is disposed at the other end of the balance members. In this way, the two balance members 20a and 20b are able to rotate about the output shaft 10. The pivot pin 21 is the pivot of the crank and connecting rod system.

In a modification which is not shown in the drawings, the crank and connecting rod system consists of a first arm which is coupled at one of its ends to the gudgeon pin carried by the toothed wheel, while at its other end this arm is connected to a second arm, or crank, through a pivot pin, this second arm being itself connected to the output shaft.

As can best be seen in FIG. 1, the pivot pin 21 has two different diameters, namely a first diameter in its central part, substantially smaller than the diameter of the bore 25 of the arm 13 so that the pivot pin can be inserted with minimal clearance into the arm 13; and a second diameter occurring at its two ends. This second diameter is substantially smaller than the diameter of the bores 24a and 24b in the two balance members 20a and 20b.

With reference to FIG. 1, the pivot pin 21 has an axial length which is greater than the combined thickness of the two balance members 20a and 20b and the arm 13, so as to leave free two end portions 26a and 26b which project on either side of the balance members. These end portions 26a and 26b are upset so as to form two rivet heads, which are also designated by the reference numerals 26a and 26b. These rivet heads retain the two balance members 20a and 20b axially about the arm 13.

Still with reference to FIG. 1, the cover plate 3 closes off the top of the casing 2. The cover plate 3 is formed generally from a thin metallic sheet, and is connected to the edges of the casing in any known way, for example by means of screws or riveting. On its inner face, the cover plate is provided with a friction plate element in the form of a thickened portion 27a, 27b. This plate element, which is fixed with respect to the cover plate, surrounds the rivet head 26a and defines two contact tracks 37a and 37b, which can be seen in FIG. 2 and which are concentric with the output shaft 10.

In this example, the thickened portion 27a, 27b is of a plastics material having a low coefficient of friction, and is a separate element attached flat on the cover plate 3.

It is also arranged that the concentric contact tracks 37a and 37b are of such a thickness that the thickened portion 27a and 27b is in contact, or abutting engagement, with the upper surface of the balance member 20a. This can best be seen in FIG. 1.

The concentric tracks 37a and 37b define between them a guide slot in the form of an arc of a circle. The composition and form of this arcuate guide slot 37a, 37b, are such that the rivet head 26a, projecting from the surface of the balance member 20a, is able to slide within the guide slot. For this reason, the radius R of the circle of which the arc defined by the guide slot 37a, 37b forms a part, corresponds to the distance between the axis 29 of the output shaft 10 and the axis 28 of the pivot pin 21.

In this way, the balance members 20a, 20b are guided in their rotational movement about the shaft 10 by the rivet head 26a sliding between the concentric contact tracks 37a and 37b. In addition, the contact of the thickened portion 27a, 27b with the balance members 20a, 20b avoids stalling of the balance members, when the arm 13 constituting a connecting rod transmits the rotary motion to the crank constituted by the balance members. The concentric contact tracks 37a and 37b thus eliminate axial forces due for example to a poor working position, which, added to the radial forces prevailing, are detrimental to the coupling between the pivot pin 21 and the arm 13 that constitutes a connecting rod.

In addition, the two end portions 30a and 30b of the arcuate guide slot 37a, 37b are able to act as end stop abutments for the upset rivet head 26a, so as to limit shocks occurring at the instant of reversal of the meshing engagement.

In the example shown in FIG. 1, the inner face of the cover plate 3 has, in addition to the thickened portion 27a, 27b, two further thickened portions 31 and 32. These further thickened portions are an integral part of a component 40 which includes a gasket portion 33 laid between the edge of the casing 2 and the edge of the cover plate 3.

Figure 3:
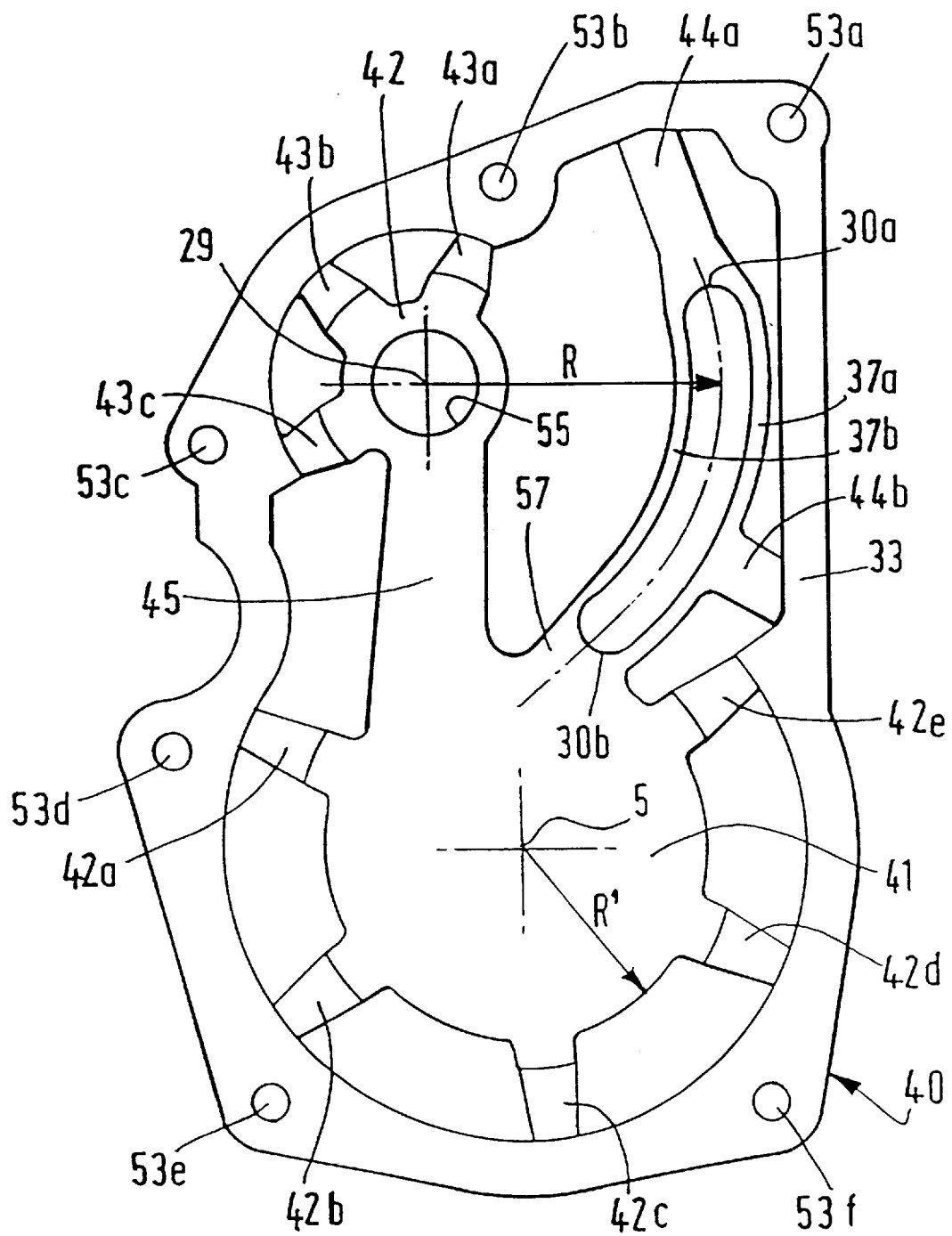
FIG. 3 is a view in elevation of the component in accordance with the invention, referred to as an abutment gasket, into which the concentric abutting engagement surfaces are incorporated.

The component 40 will be referred to as an abutment gasket. One form of this component is shown in FIG. 3, to which reference is now made. It comprises the gasket portion 33 at the periphery of the abutment gasket 40, together with a flat, circular plate portion 41, a ring portion 42, and the contact tracks 37a, 37b defining the arcuate guide slot. The abutment gasket 40 is made of a material having a low coefficient of friction, and it is arranged that it can be positioned in engagement against the cover plate 3, with the gasket portion 33 lying between the upper edge 50 of the casing 2 and the edge 51 of the cover plate 3, as can best be seen in FIG. 1.

The form of the gasket portion 33 is reproduced on the upper edge 50 of the casing 2 (with reference to FIG. 2), and on holes 52a to 52f formed in the upper edge 50, which correspond to holes 53a to 53f in the gasket portion 33. These holes 53 can be seen in FIG. 3, and the holes 52 and 53 enable the casing 2 and the cover plate 3 to be fixed together, by means of screws or rivets for example.

The gasket portion 33 thus slides exactly at the junction between the cover plate 3 and the casing 2, and provides sealing between these two components. In this connection it prevents grease or dust from penetrating into the casing.

Referring to FIG. 3, the flat plate portion 41 has a circular periphery, the radius R' of which is at least equal to the radius r measured between the axis of the shaft 5, i.e. the axis of rotation of the toothed wheel 4, and the axis of the gudgeon pin 7 which can be seen in FIG. 2. The radius R' is preferably equal to the radius r increased by that of the pin 7. The plate portion 41 is coaxial with the shaft 5, and engages against the cover plate 3.

Thus, during fitting and screw fastening of the cover plate 3 on the edge 50 of the casing, the outer face 54 of the plate portion 41, facing towards the casing 2, lies in sliding relationship on the upper surface located at the end 16 of the pin 7. Because of the composition and the circular form of the plate portion 41, the terminal surface of the end portion 16 of the pin 7 is able to slide easily throughout the circular motion of the pin 7 about the shaft 5, while the pin 7, and therefore also the end portion 14 of the arm 13 constituting the connecting rod, is positively located in the axial direction.

Still with reference to FIG. 3, the perforated ring portion 42 of the abutment gasket 40 has a central hole 55, the diameter of which is substantially greater than the diameter of the end portion 23 of the output shaft 10. It is arranged coaxially with the axis 29 of the output shaft 10, so as to surround the end portion 23; it engages firstly on the balance member 20a and secondly on the cover plate 3, when the latter is fitted on to the casing 2, as can best be seen in FIG. 1. A space is of course provided between the terminal surface 56 of the end portion 23 of the output shaft 10 and the inner surface of the cover plate 3, i.e. the surface facing towards the interior of the casing 2, when the cover plate is fitted on to the casing. The thickened portion 32 will be arranged to have a thickness sufficient to allow the end portion 23 of the output shaft 10 to avoid making contact with the inner face of the cover plate 3.

Thus, the output shaft 10 is held against axial movement by the thickened portion 32, and in addition, any radial movement of the portion of the output shaft 10 lying beyond the bearing 12 is prevented by the fact that its end portion 23 is disposed within the hole 55 of the ring portion 42. Thus the hole 55 acts in this case as a radial bearing.

The abutment gasket 40 thus provides a single component which has all of the following functions:

sealing against ingress of grease and dust into the joint between the casing 2 and the cover plate 3, by virtue of the gasket portion 33;

axial abutting engagement and radial retention at the upper end of the output shaft 10, by virtue of the ring portion 42;

abutting frictional engagement of the gudgeon pin 7, at, the end of the arm 13 constituting the connecting rod coupled to the toothed wheel 4, by virtue of the plate portion 41; and engagement and guiding for the ends of the balance member that defines the crank, so as to avoid the latter becoming stalled, this being due to the arcuate guide slot 37a, 37b.

The various connections, such as the connection between the pivot pin 21 and the connecting rod arm 13, the connection between the gudgeon pin 7 and the toothed wheel 4, and the connection between the shaft 5 carrying the toothed wheel 4 and the latter, are all improved, as is the meshing engagement between the toothed sectors 17 and 18.

In practice, and as can be seen in FIG. 3, the arcuate guide slot 37a, 37b is connected to the gasket portion 33 through tongues 44a and 44b. The plate portion 41 is connected to the gasket portion 33 through a set of tongues 42a to 42e, while the ring portion 42 is connected to the gasket portion 33 by means of tongues 43a to 43c. In addition, the arcuate guide slot 37a, 37b is connected to the plate portion 41 at a junction 57, while an arm 45 joins the ring portion 42 and plate portion 41 together. In this way, the abutment gasket 40 is a monobloc component, which can for example be made by moulding.

It is of course possible to omit connecting together in one piece the following elements: the guide slot 37a, 37b, the plate portion 41, the ring portion 42 and the gasket portion 33. This can for example be achieved by fixing one or more of these elements directly on to the inner face of the cover plate 3, by means of pegs or in any other suitable known way.

In addition, in the case in which the cover plate 3 is made of a plastics material, this material is of a low coefficient of friction, in such a way as to form, in conjunction with the cover plate, the thickened portions 27a and 27b of the arcuate guide slot 37a, 37b and/or the thickened portion 31 of the plate portion 41, and/or the thickened portion 32 of the ring portion 42, by making a single component in the same material.

In this document, the invention has been described in relation to a motorized reduction gear unit in which the crank mechanism consists of an arm defining a connecting rod having a toothed sector meshing in another toothed sector. However, it is of course also applicable to any other type of motor having a crank and connecting rod mechanism incorporated with it.

What is claimed is:

1. A motorized reduction gear unit comprising:

a hollow casing having an upper edge;

a cover plate overlying said upper edge to close the hollow casing, and having an inner surface facing towards the casing;

a first shaft carried by and within the casing;

a toothed wheel mounted on the first shaft for rotation about the first shaft;

a gudgeon pin carried by the toothed wheel and defining an axis parallel to the first shaft but offset eccentrically from the first shaft;

a connecting rod coupled to said gudgeon pin;

a pivot pin carried by the connecting rod;

a crank having a first end articulated on the pivot pin and a second end remote from the pivot pin; and an output shaft carried by the casing and coupled to said second end of the crank, whereby to derive alternating rotary motion of the output shaft from continuous rotary motion of the toothed wheel, wherein said unit further comprises a peripheral gasket disposed between the upper edge of the casing and the cover plate, and a friction plate element disposed fixedly on said inner surface of the cover plate and joined to the peripheral gasket, said friction plate element and said peripheral gasket constituting a monobloc component.

2. A motorized reduction gear unit according to claim 1, wherein the friction plate element extends over the whole path of motion of said gudgeon pin about said first shaft.

3. A motorized reduction gear unit according to claim 1, wherein said monobloc component further includes a perforated friction ring portion coaxial with the output shaft.

4. A motorized reduction gear unit according to claim 1, wherein said monobloc component is of a material having a low coefficient of friction.

5. A motorized reduction gear unit comprising:

a hollow casing having an upper edge;

a cover plate overlying said upper edge to close the hollow casing, and having an inner surface facing towards the casing;

a first shaft carried and within the casing;

a toothed wheel mounted on the first shaft for rotation about the first shaft;

a gudgeon pin carried by the toothed wheel and defining an axis parallel to the first shaft but offset eccentrically from the first shaft;

a connecting rod coupled to said gudgeon pin;

a pivot pin carried by the connecting rod;

a crank having a first end articulated on the pivot pin and a second end remote from the pivot pin; and an output shaft carried by the casing and coupled to said second end of the crank, whereby to derive alternating rotary motion of the output shaft from continuous rotary motion of the toothed wheel, wherein said unit further has a peripheral gasket disposed between the upper edge of the casing and the cover plate, and a friction plate element disposed fixedly on said inner surface of the cover plate and joined to the peripheral gasket, said friction plate element and said peripheral gasket constituting a monobloc component wherein said monobloc component has an engagement surface disposed on said inner face of the cover plate, for abutting engagement thereon of said first end of the crank.

6. A motorized reduction gear unit according to claim 5, wherein said engagement surface comprises at least one arcuate contact zone concentric with the output shaft.

7. A motorized reduction gear unit according to claim 5, wherein said engagement surface comprises two concentric contact zones defining between them an arcuate slot.

8. A motorized reduction gear unit according to claim 7, defining a circle, an arc of which is defined by said slot, said circle being centered on an axis of the output shaft and having a radius substantially equal to a distance between the axis of the output shaft and an axis of said pivot pin.

9. A motorized reduction gear unit according to claim 5, wherein said monobloc component further includes a perforated friction ring portion coaxial with the output shaft, and connecting means molded with and joining together at least two of the parts of the monobloc component comprising the gasket, friction plate element, friction ring portion, and engagement surface.

* * * * *